United States Patent [19]

Akutsu

[11] Patent Number: 4,467,332

[45] Date of Patent: Aug. 21, 1984

[54] PROCESS FOR REGENERATING INK SHEET

[75] Inventor: Eiichi Akutsu, Ichikawa, Japan

[73] Assignee: Ricoh Company, Ltd., Tokyo, Japan

[21] Appl. No.: 473,183

[22] Filed: Mar. 8, 1983

[30] Foreign Application Priority Data

Mar. 12, 1982 [JP] Japan .................................. 57/39919

[51] Int. Cl.[3] ............................................ G01D 15/10

[52] U.S. Cl. .................................. 346/140 R; 346/21; 400/200

[58] Field of Search ........... 346/140 R, 135.1, 76 PH, 346/21; 400/197, 200, 120, 131

[56] References Cited

U.S. PATENT DOCUMENTS 4,246,839 1/1981 Willbanks ........................ 346/140 R
4,272,773 6/1981 Halasz ............................ 346/140 R
4,314,257 2/1982 Tokunaga et al. ............ 346/76 PH
4,359,748 11/1982 Pasini et al. ..................... 346/140 R
4,425,569 1/1984 Kawanishi et al. ........... 346/76 PH

*Primary Examiner*—J. V. Truhe
*Assistant Examiner*—A. Evans
*Attorney, Agent, or Firm*—Flynn, Thiel, Boutell & Tanis

[57] ABSTRACT

A process for regenerating an ink sheet which comprises disposing an electrodepositing electrode in contact with a base layer of a used ink sheet comprised of a base layer and an ink layer superimposed on one side of said base layer, said ink layer having hollowed parts therein; disposing an opposed electrode at a fixed interval on the side of said ink layer; supplying a powder ink onto the surface of the opposed electrode while impressing a fixed voltage between these electrodepositing electrode and opposed electrode, said powder ink being formed of the same or substantially same components as those of said ink layer; transferring said powder ink from the surface of said opposed electrode to the hollowed parts of the ink layer for adhering thereto; and thereafter fixing.

7 Claims, 2 Drawing Figures

PROCESS FOR REGENERATING INK SHEET

BACKGROUND OF THE INVENTION (1) Field of the Invention

The present invention relates to a process for regenerating an ink sheet, in particular relates to a process for regenerating an ink sheet comprising a base layer and an ink layer formed on one side of said base layer, wherein the ink layer of the ink sheet (used ink sheet) after part of the ink layer has been transferred onto an object-to-be-recorded for the purpose of recording is restored to the former condition.

(2) Description of the Prior Art

Up to the present, there are known (a) an electro-transfer recording method which comprises the steps of superimposing, on a recording medium (object-to-be-recorded), an ink layer of an ink sheet comprising an electrically conductive base layer and an ink layer superimposed on said base layer; bringing the base layer of the ink sheet into contact with a needle-like recording electrode and a return electrode disposed at a fixed interval from said recording electrode; impressing an image signal voltage between the recording electrode and the return electrode for applying an electric current to the ink sheet; and melting part of the ink layer by means of Joule heat caused by the application of an electric current to thereby transfer the resulting melt onto the object-to-be-recorded, and (b) a heat-transfer recording method which comprises the steps of superimposing an object-to-be-recorded on an ink layer of an ink sheet comprising an base layer and an ink layer superimposed on said base layer; disposing a heating element on the base layer side; applying an image signal electric current to this heating element for heating the heating element; thus heating the base layer and the ink layer to thereby melt part of the ink layer; and transferring the resulting melt onto the object-to-be-recorded.

And, a process for regenerating an ink sheet is also known which comprises adhering or charging a fresh ink into the hollowed parts formed in the ink layer after part of the ink layer has been heat-transferred onto the object-to-be-recorded by means of said electro-transfer recording method and said heat-transfer recording method. As the regenerating processes of this type there can be enumerated for instance (i) a process comprising the steps of impressing a fixed electric charge onto the surface of an ink layer of an ink sheet by means of a corona charger; thereafter supplying the ink layer with a powder ink having a polarity opposite to that of said electric charge; and adhering the powder ink to the ink layer by the action of electrostatic force, (ii) a process comprising the steps of melting a thermo-fusible ink and coating an ink layer with this melt; and the like.

However, the process (i) is defective in that since the charge amount at the hollowed part of the ink layer is smaller than that at the portion other than the hollowed part of the ink layer in such a state that said electric charge has been impressed onto the surface of the ink layer by means of the corona charger, it is impossible to supply a sufficient amount of powder ink to the hollowed part of the ink layer, and therefore the hollowed part still remains on the surface of the ink layer even after regeneration.

The process (ii) is also defective in that since said process is not designed to supply a larger amount of ink to the hollowed part in comparison with the portion other than the hollowed part, the hollowed part still remains on the surface of the ink layer even after regeneration.

SUMMARY OF THE INVENTION

It is an object of the present invention to provide a process for regenerating an ink sheet which is capable of eliminating the above mentioned drawbacks and can be re-used to the full. It is another object of the present invention to provide a process for regenerating an ink sheet which can dispense with specially troublesome means and can be carried out with good efficiency.

That is, the process for regenerating an ink sheet according to the present invention is characterized by the steps of disposing an electrodepositing electrode in contact with a base layer of a used ink sheet which comprises an electrically conductive base layer and an ink layer with hollowed part, said ink layer being formed on one side of the base layer; disposing an opposed electrode at a fixed interval on the side of said ink layer; impressing a fixed voltage between said electrodepositing electrode and said opposed electrode; supplying a powder ink onto the surface of the opposed electrode while holding this impressed state, said powder ink being comprised of the same or substantially same components as those of the ink layer and having a fixed voltage or conductivity sufficient to permit injection of inductive charge from the opposed electrode; transferring this powder ink from the surface of said opposed electrode mainly to the hollowed parts of the ink layer for adhering thereto; and thereafter fixing said adhered powder ink to the base layer.

DETAILED DESCRIPTION OF THE PREFERRED EMBODIMENTS

An ink sheet to be regenerated by the process of the present invention is a used one which comprises an electrically conductive base layer and an ink layer with hollowed part superimposed on one side of said base layer. The term "hollowed part" used herein denotes a place where a depression is formed by transfer of a part of the ink layer to an object-to-be-recorded in the form of ink as the result of the ink sheet having been subjected to recording (electro-transfer recording, heat-transfer recording). Accordingly, hollowed parts are formed innumerably in the surface of the ink layer. Normally, they lack uniformity in their dimensional width and depth.

Figure 1:
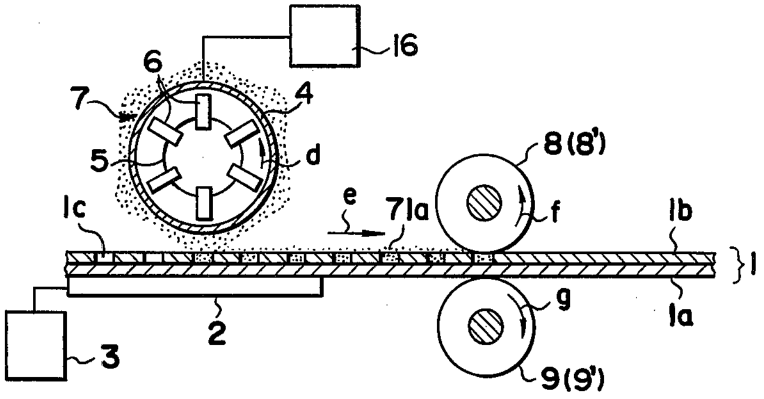
FIG. 1 is a schematic view illustrating one example of the apparatus suitable for practising the process according to the present invention.

FIG. 1 shows a double-layered ink sheet 1 which comprises superimposing an ink layer **1*b* on one side of an electrically conductive base layer 1*a*. Although not shown in the attached drawing, a three-layered ink sheet, which comprises providing an intermediate layer, if needed, between the base layer 1*a* and the ink layer 1*b*,** may be subjected to the process according to the present invention.

As the ink sheet 1 used in the electro-transfer recording method there are known the one of such a type that Joule heat is generated at the base layer **1*a* and the one of such a type that Joule heat is generated at the ink layer 1***b*. Furthermore, the base layer 1*a* constituting the ink sheet 1 used in the electro-transfer recording method is known to include the one which comprises dispersing or dissolving a conductive agent in a resin film, the one having the so-called anisotropic conductivity wherein there is a difference between the resistance in the plane direction and that in the thick direction and the resistance in the thick direction varies with the location, and the like. It is needless to say that the above enumerated ink sheets 1 are applicable to the process according to the present invention.

The ink layer 1*b* can be obtained by dispersing or dissolving a coloring agent in a binder resin or by dispersing or dissolving a coloring agent and a conductive agent in a binder resin. In addition, there can be enumerated an ink layer formed by further adding a pressure plasticizing substance.

As the resins (binder resins) used for the formation of the ink layer 1*b*, there can be enumerated those having a softening point or a melting point of 50°-200° C., preferably 60°-120° C., such, for instance, as low molecular polystyrene, styrene-butylmethacrylate copolymer, low molecular polyamide, low molecular acryl resin (2 ethylhexyl acrylate, lauryl methacrylate or the like), low molecular polyvinyl butyral and the like. Moreover, those can be used which are obtained by adding, to the above enumerated resins, waxes such as carnauba wax and the like, fatty oils and fats such as linseed oil and the like, glycols such as polyethylene glycol, polypropyrene glycol and the like, various denatured resins and the like. Waxes such as paraffin wax, polyethylene wax and the like are sometimes employed in lieu of the above mentioned binder resins.

Taking into consideration that the ink layer 1*b* plays a role of supplying an electric current with fidelity along the configuration of the electrode needle or generating heat with fidelity along the configuration of the heating element and simultaneously plays a role of melting at a low energy so as to transfer to the object-to-be-recorded, it is necessary that the resins and the like used in the ink layer 1*b* should have a softening point or a melting point falling within the above mentioned range. In case the softening point or melting point is lower than 50° C., the object-to-be-recorded comes to suffer from background stains due to rubbing, press contact and the like caused during the transportation of the object-to-be-recorded together with the ink sheet 1. In case the softening or melting point is higher than 200° C., contrarily, it becomes impossible for the ink layer 1*b* to melt at a low energy and form a high quality heat-transfer ink.

The ink layer 1*b* is added with the coloring agent in the dispersed or dissolved form. As mentioned above, this coloring agent (coloring pigment or coloring dye) cooperates with a part of the binder (resin or the like) which is present around it to thereby form a heat-transfer ink. This coloring agent includes carbon black and additionally phthalocyanine, alkali blue, spirit black, benzidine yellow, Fast Red, Crystal Violet, iron oxide, cadmium sulfide and the like.

In case the ink layer 1*b* is required to have conductivity, the ink layer 1*b* may contain carbon black (which is the most suitable coloring agent) and additionally metal powder, high molecular tetrammonium salt and various inorganic or organic conductive substances.

The recording material used in the present invention may be actually prepared in the manner of (a) dissolving a base layer-forming resin at a temperature of 200°-400° C., thereafter extruding it from a T-die so as to prepare a film (which is available for a base layer and added with a proper amount of conductive agent, applying thereon an ink layer-forming liquid or an intermediate layer-forming liquid and an ink layer-forming liquid respectively in the named order, and drying, or (b) applying on a glass plate, metal plate or the like respective layer-forming liquids (base layer-forming liquid and ink layer-forming liquid or base layer-forming liquid, intermediate layer-forming liquid and ink layer-forming liquid) in the named order and drying, thereafter peeling off said dried coatings integrally from said glass plate, metal plate or the like.

As the typical examples of the above base layer forming resins, there can be enumerated nylon, polyester, polycarbonate, polyurethane and the like. As the resins used suitably in the intermediate layer which is provided as occasion demands, there can be enumerated resins whose softening point is 150° C. or more, typically such as vinyl chloride-vinyl acetate copolymer, vinyl chloride-vinylidene chloride copolymer, polyester and the like.

Referring to the thickness of the respective layers of the thus prepared recording material, the base layer 1 is about 1-500$\mu$, preferably 2-300$\mu$ thick and the ink layer 1*b* is about 5-50$\mu$, preferably 10-30$\mu$ thick. The suitable thickness of the intermediate layer is about 0.1-20$\mu$.

As can be conjectured from what is referred to afterwards, when taking the practice of the process of the present invention into consideration, it is desirable that the base layer 1*a* of the ink sheet 1 should have a resistivity of 10 Ωcm or less, while the ink layer 1*b* should have a resistivity of 10 Ωcm or more.

The ink sheet 1 to be regenerated by the process of the present invention is the recording material prepared as mentioned above wherein the ink layer 1*b* has hollowed parts 1*c* formed therein as shown in FIG. 1. Accordingly, the process for regenerating the ink sheet 1 with hollowed parts 1*c* will be more detailed hereinafter.

As shown in FIG. 1, the electrodepositing electrode 2 is disposed in contact with the base layer 1*a* of the ink sheet 1. The electrodepositing electrode 2 is connected with the voltage impressing circuit 3 which operates to put the electrode 2 in a fixed potential. On the other hand, the opposed electrode sleeve 4 is disposed rotatably on the side of the ink layer 1*b* of the ink sheet 1 at a fixed interval from the surface of said ink layer 1*b*. The opposed electrode sleeve 4 is rotated in the direction of arrow d by means of a driving means (not shown). Within the opposed electrode sleeve 4 there is provided a retainer 5, and a plurality of magnets 6 are fixed to said retainer 5 at fixed intervals.

In the condition like this, when a mixture 7 of a magnetic powder 72 such as iron powder or the like and a powder ink 71 which is comprised of the same or substantially same components as those of the ink layer 1*b* of the ink sheet and has a fixed voltage is supplied to the outer peripheral surface of the opposed electrode sleeve 4, said mixture 7 comes to be retained on the outer peripheral surface of the opposed electrode sleeve 4 by the magnetic force of magnets 6. Due to this, the mixture 7 is moved with the rotation of the opposed electrode sleeve 4.

The above mentioned powder ink 71 desirably should have an average particle diameter of 1-100$\mu$, preferably 3-30$\mu$ and have a standard deviation $\sigma$ of 0.5-30$\mu$.

The ink sheet 1 is moved in the direction of arrow e by means of a transport means (not shown). A heating roller 8 and an elastic supporting roller 9 are disposed in the rear of the opposed electrode sleeve 4 and on the side of the moving direction of the ink sheet 1. The heating roller 8 is located on the side of the ink layer 1b of the ink sheet, and the supporting roller 9 is located on the side of the base layer 1a of the ink sheet. Both the heating roller 8 and the supporting roller 9 are rotated in the direction of arrows f and g respectively by means of a driving means (not shown).

The ink sheet 1 is designed to be fed between the heating roller 8 and the supporting roller 9 after passage through between the electrodepositing electrode 2 and the opposed electrode sleeve 4.

The opposed electrode sleeve 4 is connected with a voltage impressing circuit 10 which operates to put its electrode 4 in a fixed potential. Accordingly, between the electrodepositing electrode 2 and the opposed electrode sleeve 4 there is created an electric field by the voltage impressing circuits 3 and 10, said electric field generating an electrostatic force for moving the electrically charged powder ink 71 from the opposed electrode sleeve 4 toward the electrodepositing electrode 2. For instance, when the powder ink 71 is charged positively, the voltage impressing circuit 3 operates to put the electrodepositing electrode in a fixed negative potential (−50−−800 V), and the voltage impressing circuit 10 operates to put the opposed electrode sleeve 4 in a fixed positive potential (0−+800 V). In this instance, the opposed electrode sleeve 4 may be earthed.

The mixture 7 is a supplied onto the surface of the opposed electrode sleeve 4 while maintaining the electric field created between the electrodepositing electrode 2 and the opposed electrode sleeve 4. Due to this, an electro-static force, which is stronger than the electrostatic attraction working between the electric charge of the powder ink 71 and that of the magnetic powder 72 (the electric charge of the magnetic powder 72 caused by its friction with the powder ink 71), is exerted upon the electric charge of the powder ink 71 from said electric field, whereby the powder ink 71 is moved from the surface of the opposed electrode sleeve 4 toward the electrodepositing electrode 2 and is adhered to the ink layer 1b of the ink sheet.

In this case, since an electric current is substantially applied between the electrodepositing electrode 2 and the opposed electrode sleeve 4 and voltage drop is caused in the ink layer 1b, there is established the following inequality: $|VA|>|VB|$ (wherein, VA denotes the surface potential of the hollowed part 1c of the ink layer 1b and VB denotes the surface potential of the portion other than the hollowed part of the ink layer 1b). Hence, it is calculated from said inequality that the magnitude of electrostatic force exerting upon the charge of the powder ink 71 is larger at the hollowed part 1c of the ink layer 1b than at the part other than the hollowed part of the ink layer 1b. Accordingly, much of the powder ink 71 adheres to the hollowed part 1c than the part other than the hollowed part of the ink layer 1b.

In order to arrange the difference between VA and VB to be more than a fixed value (50 V or more, preferably 150 V or more), it is desirable that the resistance of the ink layer 1b has been set at 10 Ωcm or more previously. In this connection, it is desirable that the base layer 1a of the ink sheet should rather be conductive and its resistance should be 10 Ωcm or less. Further, it is desirable that the base should be more conductive in the thick direction than in the plane direction.

The application of above mentioned means to the ink sheet 1 whose base layer 1a has an anisotropic conductivity is advantageous in that dielectric flux is concentrated and thus the powder ink 71 is adhered concentrically to the hollowed part 1c of the ink layer 1b.

In the process which comprises transferring the powder ink 71 from the surface of the opposed electrode sleeve 4 to the hollowed part 1c of the ink sheet by the aid of this magnetic powder 72, the distance between the base layer 1a of the ink sheet and the opposed electrode sleeve 4 is set to be very larger than the thickness of the ink layer 1b, i.e., about 0.5–8 mm.

The ink sheet 1, wherein the powder ink 71 has been adhered to the hollowed part 1c of the ink layer, is fed between the heating roller 8 and the supporting roller 9. The heating roller 8 acts to heat-melting the powder ink 71a adhered to the hollowed part 1c of the ink layer and fix said ink onto the base layer 1a.

According to this heat-melting fixation, not only the powder ink 71a adhered to the hollowed part 1c but also the powder ink slightly adhered to the part other than the hollowed part of the ink layer 1b and further the surface of the ink layer 1b are melted and pressurized into plane, whereby the surface of the ink layer 1b after fixation is more smoothed.

The means for this heat-melting fixation should not be limited only to the heating roller 8. In other words, the means using laser, an infrared ray lamp and the like may be selected as occasion demands.

Up to now, explanation has been made on the case where the non-magnetic powder ink is used and fixation is effected by employing the heat-melting means. However, it may be considered to use the magnetic powder ink and to effect fixation by pressurization.

Figure 2:
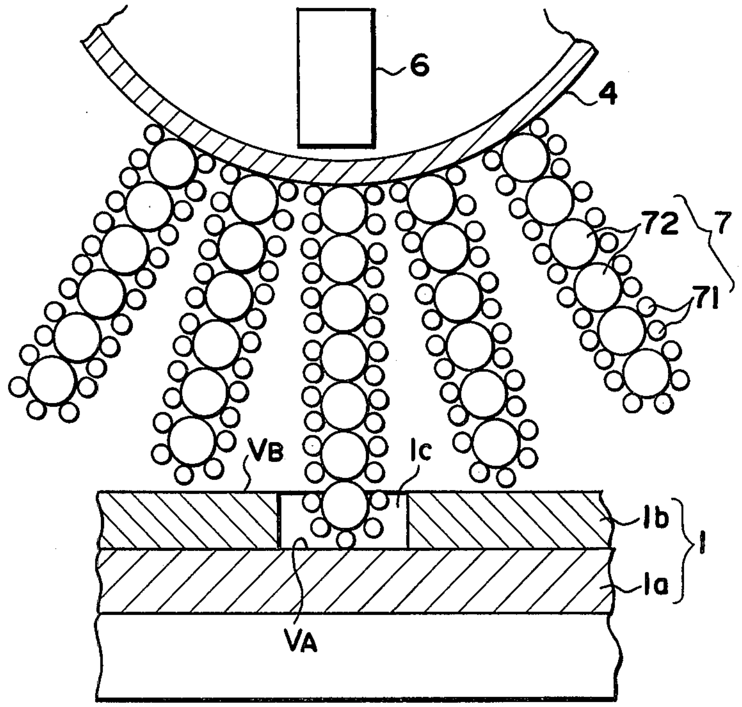
FIG. 2 is a view illustrating the state of transferring a non-magnetic powder ink from the surface of an opposed electrode sleeve to the hollowed part of an ink layer.

The magnetic powder ink contains aforesaid magnetic powder materials therein. Therefore, the use of this magnetic powder ink naturally dispenses with the presence of magnetic powder 72 as shown in FIG. 2. Due to this, the distance between the base layer 1a of the ink sheet and the opposed electrode sleeve 4 is reduced (about 50–2000μ).

The magnetic powder ink is held on the surface of the opposed electrode sleeve 4 and then is supplied therefrom to the hollowed part 1c of the ink layer 1b of the ink sheet. In this case, when the magnetic powder ink approaches the base layer 1a where the hollowed part 1c is located, an electric charge having a polarity opposite to that of the base layer 1a is caused in the magnetic powder ink, and consequently the electrostatic force comes to overcome the magnetic restraint so that the magnetic powder ink may adhere to said hollowed part 1c.

When this magnetic powder ink is used, the ink layer 1b of the regenerated ink sheet 1 contains at places the magnetic substance. However, this fact does not prove any hindrance to the practice of recording. As a matter of course, it is possible to use the ink sheet 1 whose ink layer 1b has contained the magnetic substance initially.

Next, when employing the pressure fixing means, it is required in order to fix the powder ink (or magnetic powder ink) with good results that a proper amount of pressure plasticizing substance is added to said powder ink or magnetic powder ink, said substance having a property of deforming its plasticity when subjected to pressure over the fixed range (2 Kg or more/$cm^2$). Accordingly, the term "powder ink or magnetic powder ink" used herein signifies the one which melts at a temperature over the fixed temperature range and deforms its plasticity when subjected to a pressure over the fixed pressure range.

As the typical examples of said pressure plasticizing substance there can be enumerated natural products such as vegetable wax, animal wax, mineral wax, solid fat and the like, high fatty acid or its derivatives. More specifically, there can be enumerated carnauba wax, beewax, montan wax, paraffin wax, palmitic acid, stearic acid, behenic acid, $C_{16}$–$C_{22}$ high fatty acid amides, alkali metal salt or alkaline earth metal acid, polyethylene wax, polyethylene oxide and the like.

The suitable amount of said pressure plasticizing substance in a powder ink or magnetic powder ink is 10–1000 parts by weight per 100 parts by weight of the resin binder. When the powder ink or magnetic powder ink containing this pressure plasticizing substance is used, the ink layer **1*b* of the regenerated ink sheet 1 contains at places the pressure plasticizing substance. However, this fact does not prove any hindrance to the practice of recording. As a matter of course, it is possible to use the ink sheet 1 whose ink layer 1*b*** has contained the pressure plasticizing substance initially.

Regarding the press fixing means, it is sufficient to replace rollers 8 and 9 shown in FIG. 2 by press rollers. However, the press fixing means should not be limited thereto.

As is evident from the aforegoing, the process of the present invention permits to obtain the ink sheet in which the powder ink (including the magnetic powder ink) is effectively adhered or charged in the hollowed part **1*c* of the ink layer 1*b*** and which ensures the re-use to the full. It is also possible to apply the methods employed in electro-photography such as a fur brush developing method, a pressure developing method, a micro-field donor method, a powder cloud method and the like to the powder ink or magnetic powder ink supply means.

EXAMPLES

Example 1

1 part by weight of carbon black and 10 parts by weight of polyethylene wax having a melting point of 100° C. were mixed. This mixture was kneaded for 2 hours in a heating kneader heated to 150° C., thereafter was cooled, and then was pulverized in a jet mill. This pulverized material was classified, thereby obtaining a powder ink (71) having an average particle diameter of about 5.1μ and a standard deviation σ of about 4.7μ.

Said powder ink (71) and iron powder (72) having an average particle diameter of about 110μ were mixed in the weight ratio of 1:50. This mixture (7) was stirred for 1 hour by means of a stirrer for impressing a frictional electric charge on the powder ink (71).

On the other hand, there was prepared an ink sheet (1) which comprises superimposing an ink layer (**1*b*) on an anisotropic conductive base layer (1*a***), said ink layer being formed by dispersing 1 part by weight of carbon black in 20 parts by weight of polyethylene wax having a melting point of 100° C. and about 20μ thick, said base layer having a thickness of about 100μ, a thick directional resistance of about 5 Ω and a surface resistance of about $3\times10^9$ Ω/□.

An object-to-be-recorded was subjected to recording using this ink sheet (1) according to the electro-transfer recording method to thereby form a plurality of hollowed parts (**1*c*) on the ink layer (1*b***) of the ink sheet (used ink sheet).

In succession, by the use of the apparatus shown in FIG. 1, the mixture (7) of said powder ink and said iron powder was held by the opposed electrode sleeve (4), the distance between the opposed electrode sleeve (4) and the ink sheet was made about 1000μ, said used ink sheet (1) was transferred between the opposed electrode sleeve (4) and the electrodepositing electrode (2), the opposed electrode sleeve (4) was earthed and simultaneously the potential of the electrodepositing electrode (2) was made −350 V, and thus the powder ink (71) was supplied in the hollowed parts (**1*c***) of the ink layer of the ink sheet and adhered thereto.

Further, the ink sheet (1) with the powder ink (71) adhered thereto was allowed to pass through between the heating roller (8) impressed with pressure of 1 Kg/cm² and the supporting roller (9)—pressure of 1 Kg/cm² is impressed between rollers (8) and (9)—while holding the surface temperature of said heating roller (8) at 120° C. Because of this, the powder ink (**71*a*) present in the hollowed parts (1*c*) thermally melted and adhered onto the base layer (1*a*) as well as the ink layer (1*b*) which had hollowed parts formed thereon. Thus, the ink sheet (1**) was regenerated.

Example 2

4 parts by weight of powder ferrite having an average particle diameter of about 0.2μ, 2 parts by weight of carbon black and 5 parts by weight of polypropylene were mixed together. This mixture was kneaded for 2 hours in a heating kneader heated to 180° C., thereafter was cooled, and then was pulverized in a jet mill. This pulverized material was classified, thereby obtaining a magnetic powder ink having an average particle diameter of about 4.2μ and a standard deviation σ of about 4.1μ.

On the other hand, there was prepared an ink sheet (1) which comprises superimposing an ink layer (**1*b*) on an anisotropic conductive base layer (1*a***), said ink layer being formed by dispersing 2 parts by weight of carbon black in 5 parts by weight of polypropylene and having a thickness of about 15μ, said base layer having a thickness of about 40μ, a thick directional resistance of about 45 Ω and a surface resistance of about $8\times10^4$ Ω/□.

A used ink sheet was prepared using this ink sheet (1) and by repeating the same procedure as Example 1, and further said used ink sheet was regenerated by using the same apparatus and procedure as described in Example 1. In this instance, however, the distance between the opposed electrode sleeve (4) and the ink sheet (1) was set to be about 400μ, the opposed electrode sleeve (4) was earthed, the potential of the electrodepositing electrode (2) was set to be −300 V, and the surface temperature of the heating roller (8) was set to be 150° C., and the contact pressure between rollers (8) and (9) was set to be 3 Kg/cm².

Example 3

40 parts by weight of powder ferrite having an average particle diameter of about 0.7μ, 10 parts by weight of conductive carbon black, 48 parts by weight of polyethylene wax having a melting point of 90° C. and 2 parts by weight of Nigrosine were mixed together. This mixture was kneaded in a heating roll mill heated to 150° C., thereafter was cooled, and then was pulverized in a jet mill. This pulverized material was classified to thereby obtain a magnetic powder ink having an average particle diameter of about 11μ and a standard deviation σ of about 6.1μ.

On the other hand, there was prepared an ink sheet (1) which comprises superimposing an ink layer (1b) on an anisotropic conductive base layer (1a), said ink layer being formed of the exactly same kneaded material as used in the preparation of said magnetic powder ink and having a thickness of about 25μ, said base layer having a thickness of about 30μ, a thick directional resistance of about 3 Ω and a surface resistance of about $3\times10^3$ Ω/□.

A used ink sheet was prepared using this ink sheet (1) and by repeating the same procedure as Example 1, and further said used ink sheet was regenerated by using the same apparatus and procedure (wherein, the heating rollers 8 and 9 were replaced by pressure rollers 8' and 9'). In this instance, however, the distance between the opposed electrode sleeve (4) and the ink sheet (1) was set to be about 500μ, the opposed electrode sleeve (4) was earthed, and the potential of the electrodepositing electrode (2) was set to be −250 V. Further, as the pressure rollers 8' and 9' these were employed stainless rollers having a diameter of 80 mm. These pressure rollers 8' and 9' were made to have the width of nip of 1 mm, and the linear pressure in their press-contacted state was set to be 50 Kg/line.

The ink sheet referred to herein is available not only for electro-transfer recording but for press-transfer recording.

Example 4

A mixture comprising 90 parts by weight of 6-nylon and 10 parts by weight of carbon black was fully kneaded in a three-roll mill heated to 200° C. The resulting kneaded material was heated to 300° C., and the same was extruded by means of an extruding method using a T-die thereby to obtain a film (base layer 1a) having a thickness of about 100 Ω. The resistance of this base layer 1a was 100μ.

In succession, an ink layer (1b) having a thickness of about 15μ was prepared by applying a dispersion on the base layer (1a) by means of a blade whose gap is 100μ, said dispersion being obtained by dispersing a mixture of the following composition in a ball mill for 24 hours:

| | |
|---|---|
| Oligostyrene (softening point: 65° C.) | 85 parts by weight |
| Carbon black | 15 parts by weight |
| Cyclohexane | 900 parts by weight |

The thus prepared ink sheet (1) as a whole was observed to have a resistance value of 5 KΩ and to be available for the electro-transfer recording purpose with excellent results.

On the other hand, 85 parts by weight of oligostyrene (softening point: 65° C.) and 15 parts by weight of carbon black were mixed. The resulting mixture was kneaded in a heating roll mill heated to 120° C., thereafter cooled, and then pulverized in a jet mill. This pulverized material was classified thereby to obtain a powder ink having an average particle diameter of about 8.5μ and a standard deviation σ of about 4μ.

A used ink sheet was prepared by using said ink sheet (1) and according to the same procedure as Example 1, and this used ink sheet was regenerated by using the same apparatus and procedure as Example 1. In this instance, however, the distance between the opposed electrode sleeve (4) and the ink sheet (1) was set to be 2 mm, the opposed electrode sleeve (4) was earthed, the potential of the electrodepositing electrode (2) was set to be −400 V, and the surface temperature of the heating roller (8) was set to be 80° C. The contact pressure between rollers (8) and (9) was set to be 2 Kg/cm².

The ink sheets regenerated according to Example 1 to Example 4 were each observed to exhibit a substantially plane surface and to have reusability for recording purpose.

I claim:

1. A process for generating an ink sheet which comprises disposing an electrodepositing electrode in contact with a base layer of a used ink sheet comprised of an electrically conductive base layer and an ink layer superimposed on one side of said base layer, said ink layer having hollowed parts therein; disposing an opposed electrode at a fixed interval on the side of said ink layer; supplying a powder ink on the surface of the opposed electrode while impressing a fixed voltage between these electrodepositing electrode and opposed electrode, said powder ink being formed of the same or substantially same components as those of the ink layer and having a fixed voltage or conductivity sufficient to permit injection of inductive charge from the opposed electrode; transferring said powder ink from the surface of said opposed electrode mainly to the hollowed parts of said ink layer for adhering thereto; and thereafter fixing said adhered powder ink onto the base layer.

2. A process according to claim 1 wherein the distance between said ink layer and said opposed electrode is in the range of 0.5–8 mm.

3. A process according to claim 1 wherein the voltage impressed between said electrodepositing electrode and said opposed electrode is in the range of 50–1000 V.

4. A process according to claim 1 wherein said opposed electrode is earthed in case of necessity.

5. A process according to claim 1 wherein said fixation is effected by heating.

6. A process according to claim 1 wherein said fixation is effected by pressure.

7. A process according to claim 1 wherein the magnitude of said powder ink is in the range of 1–100μ in terms of average particle diameter and in the range of 0.5–30μ in terms of standard deviation σ.

* * * * *